(12) United States Patent
Ranpuria

(10) Patent No.: US 9,121,512 B2
(45) Date of Patent: Sep. 1, 2015

(54) COUPLING ASSEMBLY WITH STERILIZING CHAMBER

(75) Inventor: Chandulal Kantilal Ranpuria, Wirral (GB)

(73) Assignee: CHARGEPOINT TECHNOLOGY LIMITED (GB)

( * ) Notice: Subject to any disclaimer, the term of this patent is extended or adjusted under 35 U.S.C. 154(b) by 1291 days.

(21) Appl. No.: 12/225,313

(22) PCT Filed: Mar. 15, 2007

(86) PCT No.: PCT/EP2007/052479
§ 371 (c)(1),
(2), (4) Date: Nov. 28, 2012

(87) PCT Pub. No.: WO2007/107500
PCT Pub. Date: Sep. 27, 2007

(65) Prior Publication Data
US 2013/0187069 A1 Jul. 25, 2013

(30) Foreign Application Priority Data
Mar. 20, 2006 (GB) .................................. 0605531.3

(51) Int. Cl.
*F16L 29/00* (2006.01)
*F16K 1/226* (2006.01)
(Continued)

(52) U.S. Cl.
CPC ................. *F16K 1/226* (2013.01); *F16K 1/222* (2013.01); *F16K 1/446* (2013.01); *F16K 27/0218* (2013.01); *F16L 29/00* (2013.01); *Y10T 29/49407* (2015.01)

(58) Field of Classification Search
CPC ...... F16K 1/446; F16K 27/0218; F16L 37/30; F16L 29/00; Y10T 137/4245; Y10T 137/4259
USPC ......... 137/238, 240, 241, 246, 614.01, 15.04, 137/15.05; 251/212
See application file for complete search history.

(56) References Cited

U.S. PATENT DOCUMENTS 2,625,410 A   1/1953 Crowley
3,532,321 A * 10/1970 Bowman et al. .............. 251/175
(Continued)

FOREIGN PATENT DOCUMENTS

DE   2609791 A1   9/1977
DE   3228157 A1   2/1984
(Continued)

*Primary Examiner* — Kevin Lee
(74) *Attorney, Agent, or Firm* — John S. Hale; Gipple & Hale

(57) ABSTRACT

A valve assembly (10) comprising two valve portions, an upper and lower valve portion (12, 14), each having a valve housing indicated generally at (16, 18), a valve seat (28, 28') and a valve closure member (20, 20') moveable between a first position in which the valve closure member is displaced from the valve seat and the valve is open, and a second position in which the valve closure member cooperates with the valve seat and the valve is closed, wherein the assembly has a first configuration in which the first and second valve portions engage with one another, the valve closure members being closed, and the valve closure members being disposed at a distance apart defining, with the housing, a chamber (29) therebetween, which is capable of being sealed from the surrounding environment, having an inlet (44, 44') and an outlet (45, 46') through which sterilizing medium may pass, and a second configuration in which the valve closure members engage with one another and are moveable from their first to their second position, and a third configuration in which two valve portions are disengaged from one another.

23 Claims, 4 Drawing Sheets

(51) Int. Cl.
  *F16K 1/22* (2006.01)
  *F16K 1/44* (2006.01)
  *F16K 27/02* (2006.01)

(56) References Cited

U.S. PATENT DOCUMENTS 4,846,212 A * 7/1989 Scobie et al. ............... 137/240
5,649,563 A * 7/1997 Shimano .................... 137/240
5,927,318 A * 7/1999 Ishibashi et al. ............ 137/240
7,597,514 B2 * 10/2009 Bryan ...................... 137/15.04
2013/0160863 A1 * 6/2013 Yates ...................... 137/15.01

FOREIGN PATENT DOCUMENTS

EP 0760447 A1 3/1997
EP 1154208 A1 11/2001
GB 2362151 A 11/2001

* cited by examiner

COUPLING ASSEMBLY WITH STERILIZING CHAMBER

BACKGROUND OF THE INVENTION

The present invention relates to valves, and in particular, but not exclusively, to valves for controlling, charging, discharging and/or regulating the flow of powders and/or fluids.

Valves, such as split butterfly valves, are available in many designs and used widely for processes where product containment is required to prevent product exposure to environment and personnel working in close proximity of the product. The split valves are designed pre-dominantly for handling and contained transfer of solid state powders and granular material alike.

Split valve design allows the valve to be split open into two halves, commonly called alpha and beta halves, or active and passive halves. The valve design is such that when split, the two halves keep the contents on either side sealed and contained.

Similar to the split butterfly valve, a split ball valve can also be used for contained transfer of solids and more commonly liquids. Historically, these valves have mainly been used in pharmaceutical and biotech industries for non-sterile operations.

In sterile equipment design, full systems need to be sterilised and once sterilised, it is important to ensure sterility is maintained throughout the processing cycle, for example, adding of materials, discharging of materials, any process transfers between systems etc.

Split valves can be sterilised via a number of known methods, which include autoclaving, passing steam through the open valve, or passing other gases, such as vapourised hydrogen peroxide, through them prior to any product coming in contact with the internal surfaces or product contact parts.

Unfortunately, when one of these conventional known valves is split, sterility is lost or compromised as some of the critical surfaces of the valve and seats, when split into two halves, become exposed to the outside surrounding non-sterile atmosphere. If the split valve is subsequently re-docked, and opened up for transfer of material, the entire system can lose sterility and result in product contamination.

In the manufacture of pharmaceuticals, chemicals or biological material, effective containment is essential for the safe and hygienic handling of such compounds and materials. At each stage of the manufacturing process, handling must be controlled and managed to provide optimum protection for the operator and for maintaining the integrity of the product.

The material being handled is often hazardous to health, owing to the increasing potency of many new active pharmaceutical ingredients (APIs). Pharmaceutical and bio-manufacturing products are often manufactured under strict controls against product contamination. This is because the products are often for human consumption and the industries are heavily regulated by bodies like the FDA (Food and Drug Administration) in the United States and the MHRA (Medicines and Healthcare products Regulatory Agency) in the United Kingdom. Furthermore, the APIs may, in sufficient quantities, be hazardous to the health of an operator. It is therefore necessary to avoid direct contact between an operator and the potentially hazardous material.

To avoid such direct contact, there is an increasing requirement to mount containment enclosures around process equipment. However, the design of such enclosures must minimise any hindrance to the operation of the equipment. When using a split valve assembly, this can become difficult for an operator to handle in such contained environments.

In addition, at the conclusion of each processing operation, the interior surfaces of the structure enclosing the processing zone must be thoroughly cleaned by the operator prior to a further processing operation to minimise the risk of cross-contamination. Consequently, the pharmaceutical manufacturing industry demands good containment performance to achieve acceptable operator exposure levels.

For handling a solid (e.g. powder) or liquid product of a sensitive or hazardous (e.g. toxic) nature in a processing zone, there are available a number of different types of containment assembly. One such conventional containment assembly is a barrier isolator with gloved access to the processing zone in which a product and/or handling equipment may be manipulated. A barrier isolator may offer two fold protection, namely the use of glove ports to maintain a physical barrier between the product and the operator and an extraction fan system to create an air flow for removing airborne particles from the processing zone and capturing the particles by means of filters. In this manner, a barrier isolator can achieve high containment typically down to nanogram level.

However, isolators designed for containment and sterility combined together, maintaining a sterile and sealed environment, both for the integrity of the material being handled and an operator's health, can be very expensive.

It is an object of the present invention to overcome or alleviate one or more of the problems associated with the prior art.

In accordance with the present invention, there is provided a split valve assembly comprising two valve portions complementarily shaped such that the first can sealingly engage with and co-operate with the second to allow the movement of material therethrough, each valve portion comprising a housing, a valve seat and a valve closure member moveable between a first position in which the valve closure member is displaced from the valve seat and the valve is open, and a second position in which the valve closure member co-operates with the valve seat and the valve is closed, wherein the assembly has a first configuration in which the first and second valve portions engage with one another, the valve closure members being closed, and the valve closure members being disposed a distance apart defining, with the housing, a chamber therebetween, which is capable of being sealed from the surrounding environment, having an inlet and an outlet through which sterilising medium may pass, and a second configuration in which the valve closure members engage with one another and are movable from their first to their second position, and a third configuration in which the two valve portions are disengaged from one another.

In the third configuration the two valve portions are undocked, in the first configuration the two valve portions are partly docked and in the second configuration the two valve portions are completely docked.

The valve of the present invention is able to operate in a complete sterile manner, by use of an 'in situ' sterilisation step applied before completion of each docking (i.e. when in said first configuration), regardless of how many times the valve is split open and re-docked, i.e. engaged and disengaged, ensuring sterile conditions on product or material contact surfaces.

The present invention allows the valve to have a capability to have an intermediate stage, a first configuration, during docking that allows a chamber which can be isolated from the surrounding environment to be formed between the surfaces which have been exposed to the atmosphere and which are not sterilised. These surfaces need to be sterilised before they can become exposed to the internal sterile parts of the assembly and material which may pass therethrough when the valve is fully docked and open so as to prevent contamination.

The present invention allows sterilisation to be maintained throughout the process of several product or material transfers, and is capable of allowing several dockings and un-dockings (engagement and disengagement), without compromising the sterility of the material to be transferred or internal process equipment upon which the valve portions of the present invention may be mounted. The chamber may also he cleaned using fluid gases or fluids before and after the sterilisation step, or in any sequence during the engagement/disengagement cycle, enabling the valve to be aseptic and under class A conditions without the need for sterile isolators or aseptic external environments.

Each valve portion of the assembly may be mountable on a vessel for containing material, conveyance means, such as a hose, for conveying material and/or other process equipment known to the art. The means for mounting the valve portions may comprise any means known to the art, such as for example a screw thread, interference fit, bayonet attachment etc. In an alternative embodiment, the valve portions may be integrally formed with a vessel or conveyance means.

The inlet and outlet of the chamber may be closed once the movement from the first to the second configuration is complete. In so doing, the assembly ensures that the material being transferred therethrough is not contaminated with sterilising medium.

The valve seat and valve closure member are preferably complementarily shaped to ensure that a seal is formed when the valve closure member is closed.

The valve assembly may be a split butterfly valve, split ball valve, any other split valve or quick release coupling known to the art. Preferably, the assembly is a split butterfly valve.

The inlet and/or outlet of the chamber may be formed in the housing of one of the valve portions. Preferably, both the inlet and the outlet is formed in the housing of one of the valve portions.

Preferably, the valve portions form a mating pair, one being a male valve portion, the other female. The inlet and/or outlet may be formed in the housing of one or both of the valve portions. More preferably, the inlet and outlet for the chamber is formed in the female valve portion.

In one embodiment, the chamber has circular cross section. Preferably, the inlets and/or outlets are tangentially disposed with respect to the circumference of the chamber which is formed by the first and second valve portions. This facilitates a greater sterilising effect by the sterilising medium owing to the formation of a vortex induced by the movement of the sterilising medium around the chamber.

The valve assembly may comprise a plurality of inlets and outlets through which sterilising medium may pass. Preferably, the number of inlets corresponds directly to the number of outlets. More preferably, the assembly comprises two inlets and two outlets. The two inlets and outlets are preferably arranged into pairs comprising one inlet and one outlet. Where the chamber has a circular cross section, the inlets are preferably disposed diametrically opposite one another about the circumference of the chamber; and the outlets are preferably disposed diametrically opposite one another about the circumference of the chamber. This is to help promote the formation of a vortex when sterilising medium is passed through the chamber to enhance the cleaning/sterilising effect.

The valve closure member may be pivotally mounted within the valve housing by means of opposed spindles projecting from the closure member and located in corresponding recesses within the valve housing. The valve housing may be provided with a valve seat and the valve closure member can be pivotable into and out of engagement with the valve seat to close and open the valve respectively. Preferably, the spindles are integrally formed with the valve closure member. Advantageously, the spindles and the valve closure member, may be machined from a single piece of material.

Preferably, the valve seat comprises a seal member. The seal member may preferably comprise an abutment portion and a resiliently deformable portion, such as a O-ring, located between the abutment portion and the valve housing.

In an alternative embodiment, the valve closure member may be provided with a recess for receipt of a seal which, in use, is adapted to engage against a solid portion of the valve housing.

In the case where the seal is located in a recess in the valve closure member the valve closure member may further comprise an elastomeric material covering the valve closure member and the seal located thereon.

In one embodiment, the valve closure member being pivotable beyond the position in which further displacement is normally prevented by engagement with the valve seal, the valve may further comprise biassing means for biassing the valve closure member into a position beyond its normal closed position, whereby in the absence of the valve seal the valve closure member will engage the valve seat.

The valve seal may be located either on the valve housing or on the valve closure member.

In order to ensure that the chamber, defined by the housing of one or both of the first and second valve portions and the valve closure members, is capable of being sealed from the surrounding environment, an O ring and/or inflatable seal may be disposed on the housing of one or both of the valve portions. This ensures that during cleaning, whereby sterilising medium is passed through the chamber when the assembly is in its first configuration and when material is transferred through the valve there is a significantly reduced possibility of cross-contamination between the chamber and the surrounding environment, thus ensuring that the material transferred is not contaminated and maintaining operator safety.

The sterilising medium suitable for use with the assembly of the present invention may comprise a fluid, vapour and/or gas. Preferably, the medium is vaporised hydrogen peroxide, filtered nitrogen, filtered air and/or water. For materials sensitive to heat, vaporised hydrogen peroxide is preferably used, whilst for materials not generally heat sensitive, steam under pressure at temperatures ranging between 125-135° C. can be used. Pressurised and filtered air and/or nitrogen or other such gases may be used as a cleaning medium to blow any debris, particles, residues, impurities etc. out of the chamber in lieu of or in combination with other sterilising media. If it is to be used as a sterilising medium, then the aim is preferably filtered to remove potential contaminants.

The outlet may be connected to filter means and/or a catalyst to treat any waste stream from the chamber. Preferably, when vapourised hydrogen peroxide is used, the outlet is connected to a catalyst to treat the waste stream.

During use, the assembly may be switched from the first to the second configuration to allow material to be transferred therethrough. Once the material has been transferred, the assembly is switched back to the first configuration and the surfaces which are to he exposed to the surrounding environment cleaned before disengaging the two valve portions so as to prevent the operator from being exposed to any residual material left on the exposable surfaces, and thus ensuring operator safety.

In accordance with a further aspect of the present invention, there is provided a method of moving a material from one vessel to another without exposing the material to the surrounding environment comprising the use of a valve assembly as described hereinabove, the method comprising the steps of:
a) Engaging the valve portions such that the assembly conforms to its first configuration;
b) optionally cleaning the chamber;
c) sterilising the chamber;
d) displacing the valve portions such that the assembly conforms to its second configuration; and
e) opening the valve to allow the movement of material therethrough.

Once the requisite quantity of material has been transferred, the method may also comprise the subsequent steps of:
f) displacing the valve portions such that the assembly conforms to its first configuration;
g) optionally cleaning the chamber;
h) optionally sterilising the chamber; and
i) disengaging the valve portions.

In accordance with a further aspect of the present invention, there is provided a coupling assembly comprising two coupling portions complementarily shaped such that the first can sealingly engage with and co-operate with the second to allow the movement of material therethrough, each coupling portion comprising a housing, a coupling seat and a coupling closure member moveable between a first position in which the coupling closure member is displaced from the coupling seat and the coupling is open, and a second position in which the coupling closure member co-operates with the coupling seat and the coupling is closed, wherein the assembly has a first configuration in which the first and second coupling portions engage with one another, the coupling closure members being closed, and the coupling closure members being disposed a distance apart defining, with the housing, a chamber therebetween, which is capable of being sealed from the surrounding environment, having an inlet and an outlet through which sterilising medium may pass, and a second configuration in which the coupling closure members engage with one another and are movable from their first to their second position, and a third configuration in which the two valve portions are disengaged from one another.

BRIEF DESCRIPTION OF THE DRAWINGS

By way of example only, a specific embodiment of the present invention will now be described, with reference to the accompanying drawings, in which.

Figure 1:
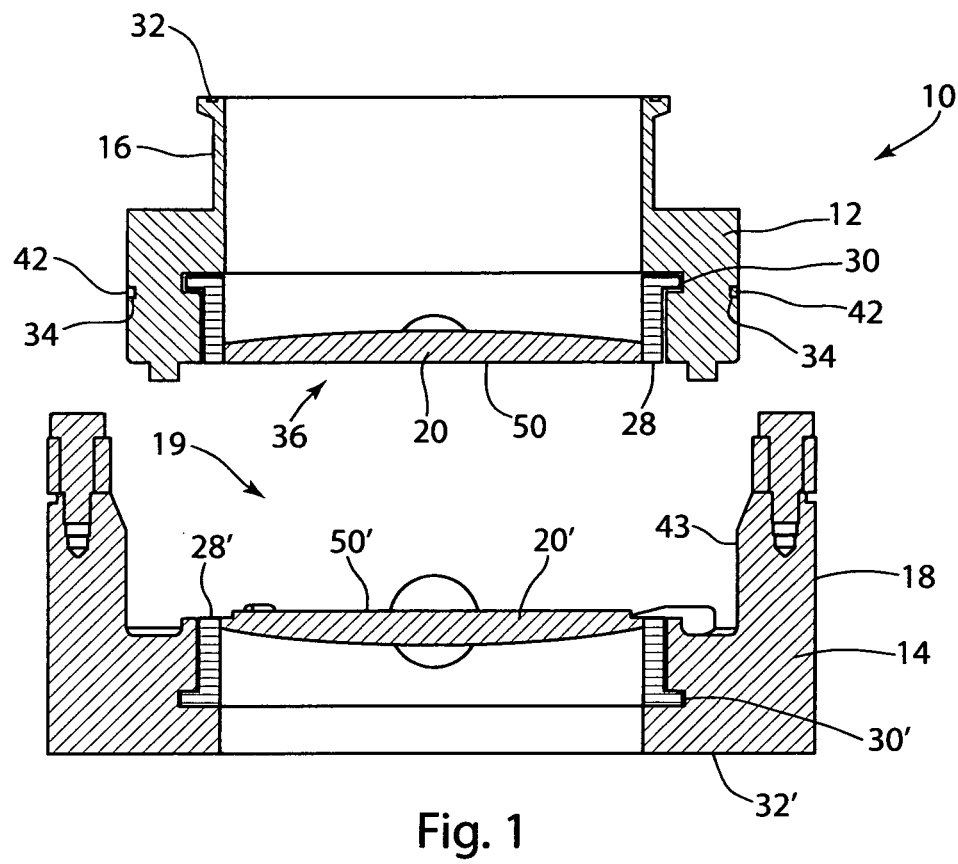
FIG. 1 is a cross sectional side elevation of two valve portions of a valve assembly in accordance with the present invention.

Referring firstly to FIGS. 1 to 4, the valve assembly 10 comprises two valve portions, an upper and lower valve portion 12,14, each having a valve housing indicated generally at 16, 18 which are generally annular and a valve closure member 20, 20' which is pivotally mounted within the housing. Valve housing 18 has an annular recess 19. The valve closure member 20,20' is in the form of an annular disc and is provided with spindles 22,22' by means of which the valve closure member is pivotally mounted within the housing. The valve closure member 20,20' and the spindles 22,22' are machined from a single piece of metal.

DETAILED DESCRIPTION OF THE INVENTION (FIG. 4) One of the spindles 22 of the lower valve closure member 18 is adapted to be received by a further spindle 24 of actuator 26, whilst the housing of lower valve portion 18 has a bore receiving the other spindle 22'. Thus, the annular disc is journalled for rotation on the spindles 22,22' and is moved by rotation of the spindle 24. An automatic actuator 26 is received on an opposite end to the annular disc of the spindle 24. A manual actuator can be used in an alternative embodiment.

The valve closure member 20,20' is engageable with and disengageable from an annular valve seat in the form of an annular seal 28,28' which is seated in a complimentarily-shaped recess 30,30' in the valve housing. The seal comprises a EPDM annular abutment portion (alternatively, perfluoroelastomer or any other suitable material can be used) which, in use, engages the valve closure member 20,20'.

Figure 2:
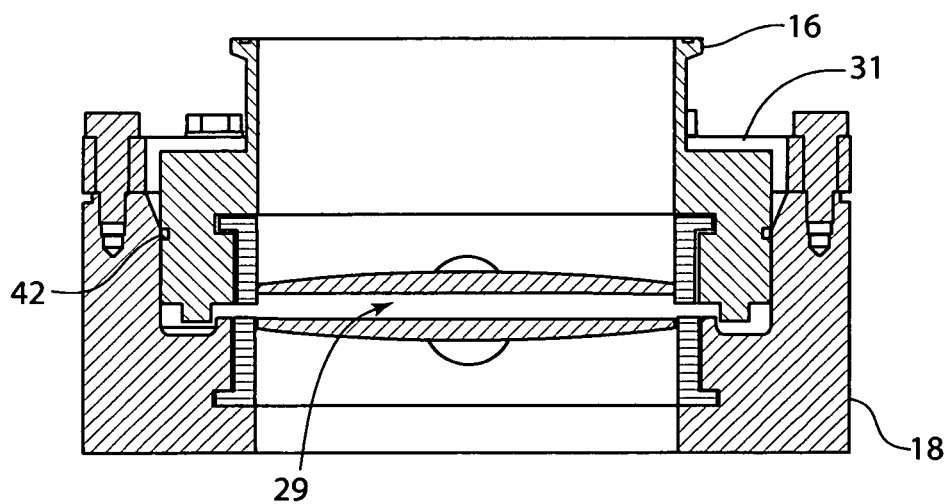
FIG. 2 is a cross sectional side elevation of a first embodiment of valve assembly in it's first configuration in accordance with the present invention
Figure 3:
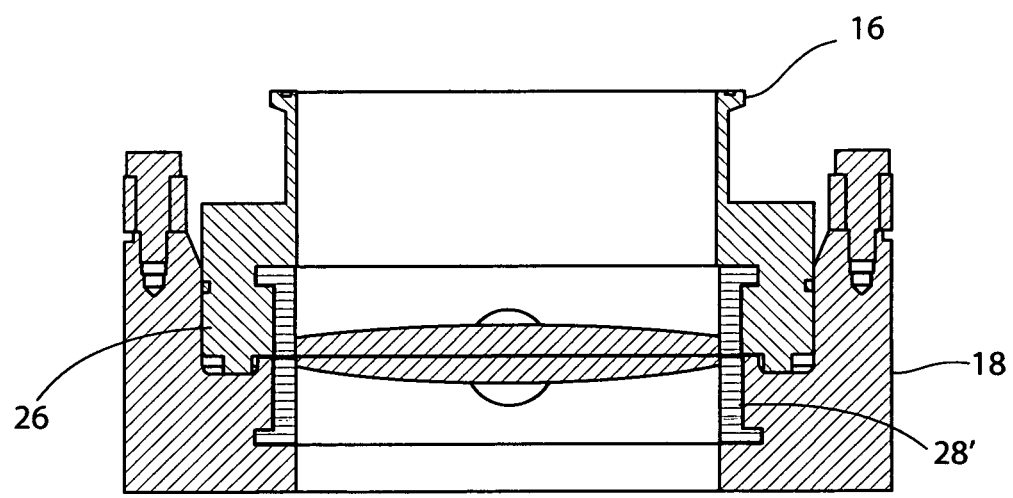
FIG. 3 is a cross sectional side elevation of a first embodiment of valve assembly in it's second configuration in accordance with the present invention.
Figure 4:
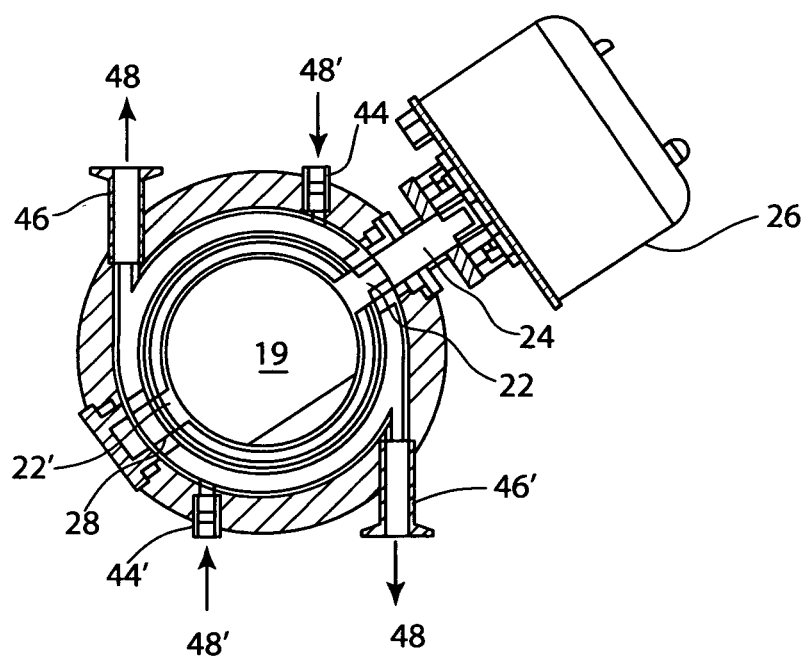
FIG. 4 is a plan view of a transverse cross section through the second valve portion of FIGS. 1-3.
Figure 5A:
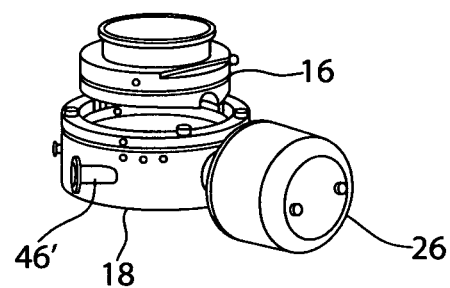
FIGS. 5a and b are perspective views of two valve portions of a valve assembly in accordance with the present invention disengaged and engaged.
Figure 5B:
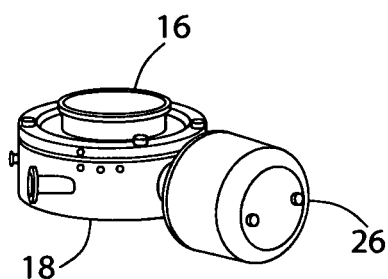

As seen in FIGS. 1 to 3, the valve assembly comprises releasably securable valve portions 16, 18 via locking ring 31 which prevents the valve portions from disengaging.

The outer end face 32,32' of each of the valve housing portions 16, 18 is planar and in use each face is connected to, for example, adjacent piping sections or a vessel in a manner well known to in the art and a through passage is formed by means of, for example, aligned bores. Upper valve portion 16 has an annular recess 34 which receives O-ring 42. When the valve portions 16, 18 are brought together, O-ring 42 co-operates with the inner side wall 43 of the housing of valve portion 18 to form a seal when the assembly is in its first configuration.

The abutment of the two valve housing portions 16,18 form a mating pair such that the upper valve portion 16 is mounted within the lower valve housing portion 18, the upper valve portion 16 being male and the lower valve portion 18 being female. In a first configuration (see FIG. 2) the two valve portions are engaged, such that the chamber is sealed from the surrounding environment and that material to be transferred through the valve will not be contaminated by the surrounding environment, and define a chamber 29 therebetween. The chamber is defined by the valve closure members 20,20' and the seal formed between inner side wall 43 of valve portion 18 and O-ring 42.

In this way, the two portions of the valve 16,18 can be sealed with respect to the exterior environment whilst defining a chamber between valve closing members 20,20' and the housings of valve portions 16, 18 by means of the co-operation between O-ring 34 and side wall 43, in contrast to the prior art arrangements. Any misalignment of the two body halves may be overcome in several ways, a preferred way being to provide longitudinally captivated locators between the two body halves (not illustrated).

Lower valve portion 18 has two tangential inlets 44,44' and two tangential outlets 46,46' (see FIG. 4) which communicate with chamber 29 when formed by bringing the two valve portions 16,18 together in the first configuration. The inlets and outlets are arranged into pairs 44, 46 and 44',46' and are disposed about the radius of annular recess 9 such that movement of a fluid or gas into chamber 29 (in the direction of arrow 48) will form a vortex ensuring thorough cleaning/sterilisation of the chamber and in particular the valve closure members 20, 20'. Sterilising medium in the form of a liquid, gas and/or vapour will be fed into the chamber 29 via one or both inlets 44,44' under pressure. The sterilising medium can then be removed from the chamber 29 via outlets 46,46' which may be connected to a vacuum pump, fan via a filter and/or catalyst to assist in the removal of sterilising medium and debris.

The valve closure members are adapted to be pivotable through 90 degrees, and when in its fully open position the profile of the inner face 50,50' of the valve closure member 20,20' corresponds with the profile of the through bore of the valve housing, thereby creating no restrictions for the flow of fluid or other material.

When the valve closure members 20,20' have been exposed to the sterilising medium for a sufficient time to ensure that any impurities or contaminants have been removed or neutralised, any residual sterilising medium can be expelled using pressurised filtered air introduced via inlets 44,44'. The valve assembly can then be fully engaged in its second configuration, whereby seats 28,28' mate to form a seal and valve closure members 20,20' contact one another and can rotate to open each valve portion respectively, which are sealingly engaged thereby allowing the passage of material therethrough without the material becoming contaminated. Rotation of the spindles 22, 22' of the lower valve closure member 20' will result in rotation of the upper valve closure member 20'.

The valves of the present invention are able to operate in a complete sterile manner, with an in situ sterilisation step before and after each docking, regardless of how many times the valve is split open and re-docked, ensuring sterile conditions on product contact parts.

The invention allows the valve to have a capability to have an intermediate stage, a first configuration, during docking that allows a barrier to be present between internal process sterile areas and the previously exposed areas which are not sterilised but need to be sterilised before they can become part of the internal sterile parts when the valve is fully docked. These "intermediate transit contact parts" have another barrier to the outside; the parts and surfaces beyond this barrier do not require sterilisation.

These barriers can be created by any combination of seals, gaskets, o rings, or seats or inflatable seals.

In the intermediate docking position, the valve allows the two halves of the butterfly disc to be separated by a nominal space which is wide enough to allow irrigation of all surfaces by either steam, cleaning agents, sterilising fluids, or gases such as vapourised hydrogen peroxide, or combinations of any or all.

The valve also has inlet entry points where these sterility liquids, gases or vapours can enter, freely flow over all intermediate surfaces, saturate all surfaces and then leave the valve intermediate areas through exit points where the sterility medium can either be re-circulated or exhausted as once through fluids.

Once the sterility cycle is completed, the valve can be fully docked, engaged, into its second configuration. Once fully docked, the intermediate parts, which are now sterile, can become part of the internal process contact parts. Opening the valve for flow allows material to pass through the sterilised surfaces, in contrast to the prior art.

Once transfer is completed, before final undocking, disengagement, of the valve portions, a CIP cycle can be carried out to remove any remaining debris of product from the areas which later will become exposed to the atmosphere, thereby providing high containment of the drug from operator exposure. The valve can be closed and returned to its intermediate position, first configuration, whereupon any residual material left on the surfaces can be cleaned using clean in place (CIP) gases or fluids introduced to and removed from the chamber via inlets 44, 44' and outlets 46, 46'. Once "cleaned" the valve can be undocked and split into two halves.

When the valve is split open into two halves, any material disposed within a vessel etc. will maintain its sterility as each valve portion is sealed from the surrounding atmosphere by the valve closure members.

The invention is not restricted to the details of the foregoing embodiments. For example, the valve actuator may be replaced with a different actuator, such as a manually-operated handle.

An alternative embodiment of the present invention replaces the butterfly valve closure members of the valve with ball closure members.

The invention claimed is:

1. A split valve assembly comprising two valve portions complementarily shaped such that a first valve portion can sealingly engage with and co-operate with a second valve portion to allow the movement of material therethrough, each valve portion comprising a housing, a valve seat and a valve closure member moveable between a first position in which the valve closure member is displaced from the valve seat and the valve is open, and a second position in which the valve closure member cooperates with the valve seat and the valve is closed, wherein the valve closure member is pivotable into and out of cooperation with the valve seat end, wherein said valve assembly has a first configuration in which the first and second valve portions engage with one another, the valve closure members being closed, and the valve closure members being disposed a distance apart defining, with said housing, a chamber, which is capable of being sealed from the surrounding environment, said chamber having an inlet and an outlet through which sterilizing medium may pass, wherein the inlet and outlet of the chamber is formed in the housing of one of the valve portions, and a second configuration in which the valve closure members engage with one another and are movable from the first to the second position, and a third configuration in which the two valve portions are disengaged from one another.

2. A valve assembly as claimed in claim 1 wherein in said first configuration the two valve portions are partly docked and in said second configuration the two valve portions are completely docked and in said third configuration, said two valve portions are undocked.

3. A valve assembly as claimed in claim 1 wherein each valve portion of the assembly is mountable on a vessel containing material.

4. A valve assembly as claimed in claim 3 wherein the valve portions comprises mounting means forming a screw thread.

5. A valve assembly as claimed in claim 3 wherein the valve portions are integrally formed with a vessel.

6. A valve assembly as claimed in claim 1 wherein the inlet and outlet of the chamber is closed once the movement from the first to the second configuration is complete.

7. A valve assembly as claimed in claim 1 wherein said valve seat and said valve closure member are complementarily shaped to ensure that a seal is formed when the valve closure member is closed.

8. A valve assembly as claimed in claim 1 wherein said split valve assembly is taken from a group consisting of a split butterfly valve, a split ball valve and a quick release coupling.

9. A valve assembly as claimed in claim 1 wherein the valve portions form a mating pair, one valve portion being a male valve portion, the other valve portion being a female valve portion.

10. A valve assembly as claimed in claim 1 wherein each valve portion has a circular cross section.

11. A valve assembly as claimed in claim 1 wherein at least one of said inlet and outlet is tangentially disposed with respect to the circumference of the chamber which is formed by the first and second valve portions.

12. A valve assembly as claimed in claim 1 wherein said valve seat comprises a seal member.

13. A valve assembly as claimed in claim 12 wherein the seal member comprises an abutment portion and a resiliently deformable portion located between an abutment portion and the valve housing.

14. A valve assembly as claimed in claim 1 wherein said chamber, defined by the housing of one or both of the first and second valve portions and the valve closure members, is capable of being sealed from the surrounding environment, by means of an O ring.

15. A valve assembly as claimed in claim 1 wherein the sterilizing medium is taken from a group of mediums consisting of a fluid, vapor and gas.

16. A valve assembly as claimed in claim 1 wherein said sterilizing medium is taken from a group of mediums consisting of vaporized hydrogen peroxide, filtered nitrogen, filtered air and water.

17. A valve assembly as claimed in claim 1 wherein the outlet is connected to a filter means to treat any waste stream from the chamber.

18. A valve assembly as claimed in claim 3 wherein each valve portion mounting means forming a conveyance means.

19. A valve assembly as claimed in claim 1 wherein said chamber is capable of being sealed from the surrounding environment, by means of an inflatable seal.

20. A valve assembly as claimed in claim 1 wherein said chamber outlet is connected to a catalyst means to treat any waste stream from the chamber.

21. A method of moving a powdered material from one vessel to another without exposing the material to the surrounding environment comprising the use of a valve assembly, the method comprising the steps of:
 a). engaging valve portions of a valve assembly so that said valve assembly conforms to a first configuration defining a chamber between said valve portions;
 b). optionally cleaning said chamber;
 c). sterilizing the chamber;
 d). displacing the valve portions such that the valve assembly conforms to a second configuration;
 e). opening the valve assembly to allow the transfer of powdered material therethrough; and
 f). repeating steps a). through d).

22. A coupling assembly comprising two coupling portions complementarily shaped such that the first coupling portion can sealingly engage with and co-operate with a second coupling portion forming a chamber to allow the movement of powdered material therethrough, each coupling portion comprising a housing, a coupling seat including a seal member and a coupling closure member moveable between a first position in which the coupling closure member is displaced from the coupling seat and the coupling is open, and a second position in which the coupling closure member engages said seal member of the coupling seat and the coupling is closed, wherein the coupling closure member is pivotable into and out of cooperation with said coupling seat, wherein the coupling assembly has a first configuration in which the first and second coupling portions engage with one another, the coupling closure members being closed, and disposed a distance apart defining a chamber with the housing, which is capable of being sealed from the surrounding environment, said chamber having two inlets positioned opposite one another about the circumference of the chamber and two outlets positioned opposite one another about the circumference of the chamber to help promote the formation of a vortex when sterilizing medium is passed through the chamber, and said coupling assembly defining a second configuration in which the coupling closure members engage with one another and are moveable from their first to their second position, and a third configuration in which the two valve portions are disengaged from one another.

23. A split valve assembly comprising two valve portions complementarily shaped such that a first valve portion can sealingly engage with and co-operate with a second valve portion to allow the movement of material therethrough, each valve portion comprising a housing, a valve seat and a valve closure member moveable between a first position in which the valve closure member is displaced from the valve seat and the valve is open, and a second position in which the valve closure member cooperates with the valve seat and the valve is closed, wherein each valve closure member is pivotable beyond a position in which further displacement is normally prevented by engagement with a valve seal, the valve closure member further including biasing means for biasing the valve closure member into a position beyond its normal closed position, whereby in the absence of a valve seal the valve closure member will engage the valve seat, and wherein said valve assembly has a first configuration in which the first and second valve portions engage with one another, the valve closure members being closed, and the valve closure members being disposed a distance apart defining, with said housing, a chamber, which is capable of being sealed from the surrounding environment, said chamber having an inlet and an outlet through which sterilizing medium may pass, wherein the inlet and outlet of the chamber is formed in the housing of one of the valve portions, and a second configuration in which the valve closure members engage with one another and are movable from the first to the second position, and a third configuration in which the two valve portions are disengaged from one another.

* * * * *